United States Patent
Shimizu (10) Patent No.: US 7,755,537 B2
(45) Date of Patent: Jul. 13, 2010

(54) METHOD AND APPARATUS FOR ADJUSTING ORIENTATION DIRECTION OF ARRAY ANTENNA OF DIRECTION DETECTION APPARATUS

(75) Inventor: Koji Shimizu, Ichinomiya (JP)

(73) Assignee: Denso Corporation, Kariya (JP)

( * ) Notice: Subject to any disclaimer, the term of this patent is extended or adjusted under 35 U.S.C. 154(b) by 178 days.

(21) Appl. No.: 11/986,854

(22) Filed: Nov. 27, 2007

(65) Prior Publication Data
US 2008/0224918 A1    Sep. 18, 2008

(30) Foreign Application Priority Data
Dec. 7, 2006   (JP)   ............... 2006-330749

(51) Int. Cl.
*G01S 13/00*   (2006.01)
(52) U.S. Cl. .................. 342/147; 342/359; 342/176
(58) Field of Classification Search ............... 342/26 B, 342/147
See application file for complete search history.

(56) References Cited

U.S. PATENT DOCUMENTS

2005/0024261 A1*   2/2005   Fujita ..................... 342/174
2006/0007036 A1*   1/2006   Natsume et al. ............... 342/70
2006/0012797 A1*   1/2006   Chang et al. ................ 356/484

FOREIGN PATENT DOCUMENTS

JP        2006-47282      2/2006

\* cited by examiner

*Primary Examiner*—Thomas H Tarcza
*Assistant Examiner*—Timothy A Brainard
(74) *Attorney, Agent, or Firm*—Harness, Dickey & Pierce, PLC (57) ABSTRACT

A direction detection apparatus transmits radar waves, with resultant reflected waves being received as incident waves by elements of an array antenna. Normally the direction of a target object is calculated based on analyzing respective received signals from the antenna elements, in calculations utilizing an estimated total number of incident wave directions. In an antenna direction adjustment mode, an actual number of target objects, and hence actual number of incident wave directions, is utilized in place of the estimated value, thereby enabling direction detection information to be obtained which does not fluctuate with time, thus facilitating the adjustment.

7 Claims, 8 Drawing Sheets

METHOD AND APPARATUS FOR ADJUSTING ORIENTATION DIRECTION OF ARRAY ANTENNA OF DIRECTION DETECTION APPARATUS

CROSS-REFERENCE TO RELATED APPLICATIONS

This application is based on and incorporates herein by reference Japanese Patent Application No. 2006-330749 filed on Dec. 7, 2006.

BACKGROUND OF THE INVENTION

1. Field of Application

The present invention relates to a method and apparatus for adjusting the orientation direction of an array antenna of a direction detection apparatus which transmits radar waves.

2. Description of Related Art

Types of direction detection apparatus are known in which radar waves are transmitted, to be reflected from objects located ahead of the apparatus (with such objects referred to in the following as target objects), and thereby returned to the direction detection apparatus as reflected incident waves that are received as signals by an array antenna. The array antenna is formed of a plurality of antenna elements, and the direction detection apparatus estimates the total number of these target objects, and calculates the respective directions of the target objects, based on respective received signals obtained from the antenna elements.

In addition to detecting the direction of target objects, such an apparatus can also estimate the distance to each target object, and the relative velocity of the target object (i.e., with respect to the direction detection apparatus). A specific example of such a type of apparatus is a FMCW (frequency modulation continuous wave) radar apparatus.

Figure 8A:
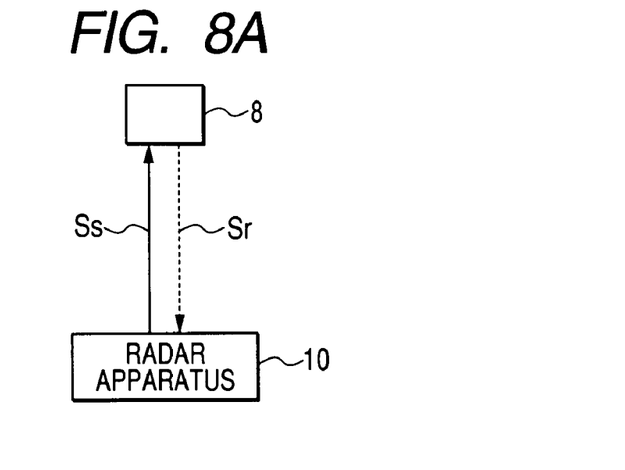
FIG. 8A is a diagram for illustrating transmitted and reflected waves of a radar apparatus.
Figure 8B:
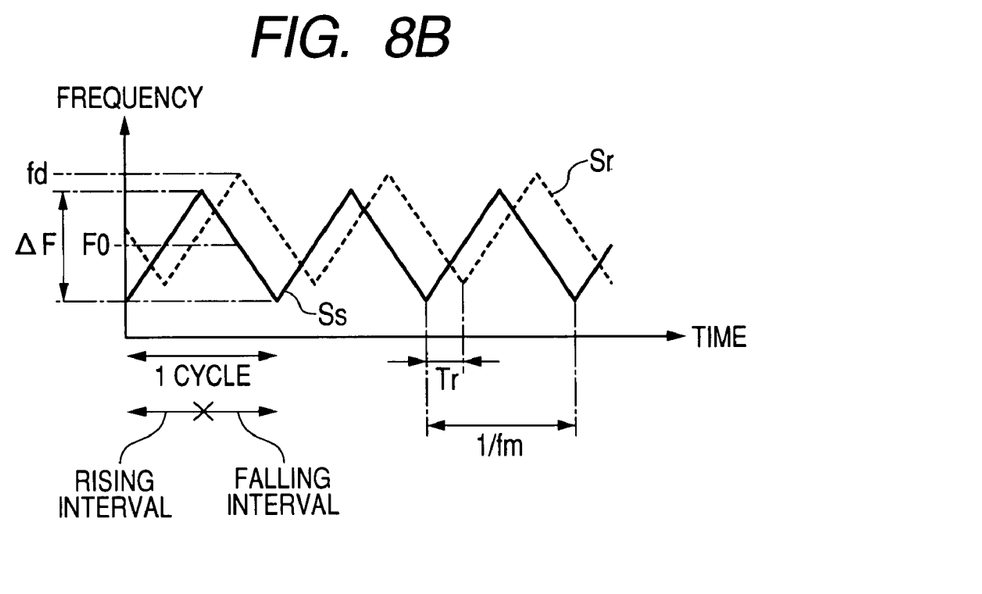
FIG. 8B is a graph of corresponding transmitted and received signals of the radar apparatus.

As shown by the full-line portions in FIGS. 8A and 8B, a FMCW radar apparatus generates a transmission signal Ss that is frequency-modulated by a triangular-waveform modulation signal, to successively linearly increase and linearly decrease in frequency within each of respective modulation periods. The part of a modulation period in which the frequency of the transmission signal Ss linearly increases is referred to in the following as the rising interval, while the part in which the frequency linearly decreases is referred to as the falling interval.

Resultant reflected radar waves are received from a target object as illustrated in FIG. 8A, with a received signal Sr being obtained as shown by the dotted-line portions in FIG. 8B. For simplicity of description, the case of a single target object as shown in FIG. 8A will be described.

As shown, the received signal Sr is delayed by the amount of time required for the radar waves to travel to and back from the target object, with that time amount indicated as Tr. In addition, the frequency of the received signal Sr is shifted by an amount fd, which is determined by the relative velocity of the target object (i.e., caused by a Doppler shift).

Figure 8C:
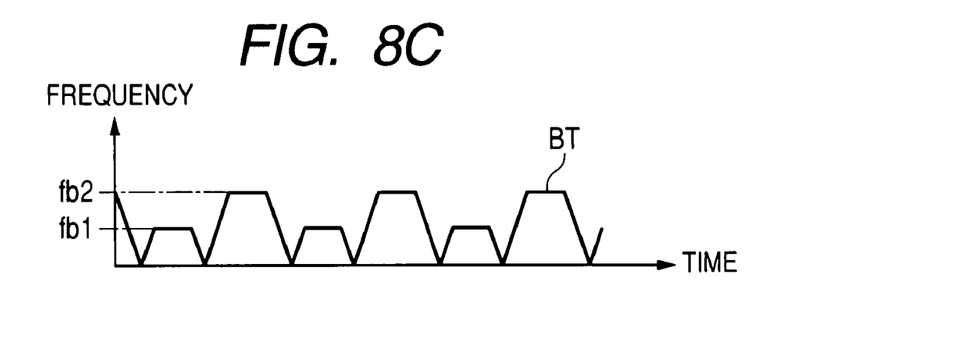
FIG. 8C is a graph of a beat signal derived from the transmitted and received signals.

With a FMCW radar apparatus, the transmission signal Ss and the received signal Sr are combined in a mixer circuit to obtain a beat signal Bt (shown in FIG. 8C), whose frequency is the difference between the respective frequencies of the transmission signal Ss and the received signal Sr. The frequency obtained for the beat signal Bt during each rising interval of the transmission signal Sr will be designated as fb1, while the frequency of Bt during each falling interval will be designated as fb2.

A frequency fr that is determined by the delay time Tr can be calculated from the beat frequency values fb1 and f, using equation (1) below, while the Doppler shift frequency fd can be calculated from fb1 and fb2 by using equation (2) below.

The distance R and the relative velocity V of the target object can be calculated based on the frequency values fr and fd, by using equations (3) and (4) below. In these equations, c denotes the propagation velocity of the (electromagnetic) radar waves, fm is the modulation frequency of the transmission signal Ss, $\Delta f$ is the frequency modulation depth of the transmission signal Ss, and F0 is the center frequency of the transmission signal Ss.

$$fr = \frac{fb1 + fb2}{2} \quad (1)$$

$$fd = \frac{fb1 - fb2}{2} \quad (2)$$

$$R = \frac{c \cdot fr}{4 \cdot fm \cdot \Delta F} \quad (3)$$

$$V = \frac{c \cdot fd}{2 \cdot F0} \quad (4)$$

Thus with a FMCW radar apparatus, by applying Fourier transform processing to the sampled beat signal BT and performing frequency analysis of the results, the range and relative velocity of a target object can be obtained.

If the direction of incident waves (reflected from a specific target object) differs from the orientation direction (i.e. reference 0° direction) of the array antenna, then the respective received signal frequencies from the array of antenna element, and hence the corresponding beat signal frequencies, will be successively different. Hence the levels of received signal power obtained at various different frequencies, from each of the antenna elements, can be used in detecting the directions of target objects, e.g., by using the MUSIC method as described in the following. For example such a method of direction detection using an antenna formed of a plurality of antenna elements is known, whereby a correlation array is derived based on the correlation between the received signals of respective antenna elements, a direction angle spectrum is obtained from the correlation array, and the direction angle spectrum is analyzed to obtain the direction of a target object, as described in Japanese patent publication No. 2006-047282.

Figure 2:
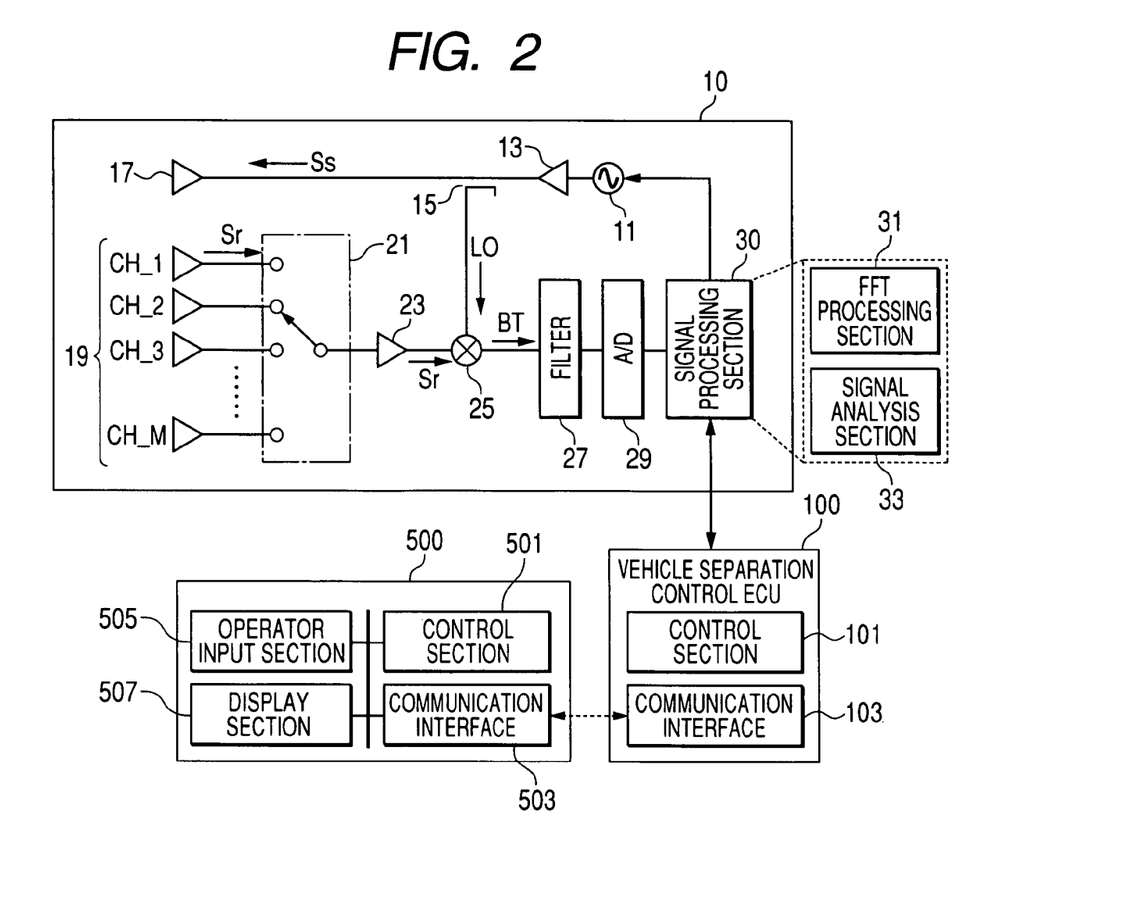
FIG. 2 is a general block diagram showing a radar apparatus utilized in the vehicle system of FIG. 1.
Figure 9A:
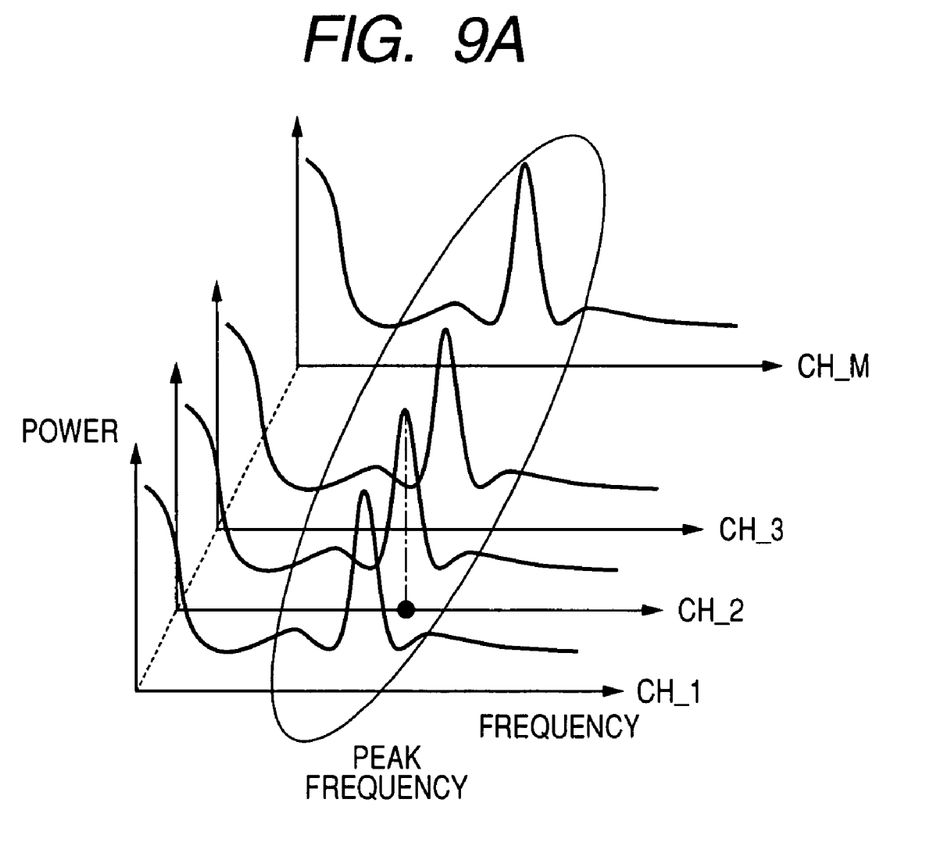
FIG. 9A is a diagram for describing a method of detecting a received signal peak that is common to a plurality of receiving channels of a radar apparatus.

The MUSIC method is widely known as a method of detecting the direction of a target object, and its principles (as applied to an embodiment of the present invention) can be summarized as follows. It will be assumed that as shown in FIG. 2, an array antenna is utilized having M antenna elements that are disposed at equidistant intervals along a straight line. For each of the received signals (CH_1~CH_M) from the antenna elements, the values of signal power and frequency that are obtained (from beat signal BT samples) during a modulation period are operated on by applying the Fourier transform to obtain a spectrum that relates signal power to frequency. FIG. 9A shows an example of the respective spectrums thereby obtained for signals CH_1~CH_M, assuming a case in which incident reflected waves are received from a single direction. As shown, this results in a common peak in the spectrums (i.e., with respectively different values of center frequency of the common peak being obtained by the signal channels CH_1~CH_M). In general, there may be a plurality of such common peaks, corresponding to respectively different incident wave directions, i.e., corresponding to respective target objects.

With the MUSIC method, for each such common peak, the Fourier transform is obtained of the values (center frequency, signal power) of the common peak respectively obtained from the various channel signals CH_1~CH_M. An array of M Fourier transform values is thereby obtained, which can be expressed as an M-dimensional received signal vector X, as in equation (5) below. By using this received signal vector X, a correlation array Rxx having M rows and M columns can be obtained, expressed by equation (6) below.

$$X=(x_1, x_2, \ldots, x_M)^T \qquad (5)$$

$$Rxx=XX^H \qquad (6)$$

The term $X_m$ (where m=1, ..., M) of the received signal vector X is the Fourier transform value of the signal obtained for the m-th signal channel (i.e., from the m-th antenna element) corresponding to a common peak, and is a complex value. In equations (5), (6), T denotes the vector transpose, and H denotes the complex conjugate transpose.

After deriving the correlation array Rxx, the eigenvalues $\lambda 1 \sim \lambda m$ of the correlation array Rxx are derived (where $\lambda 1 \geq \lambda 2 \geq \ldots \lambda m$), and an incident wave number L (i.e., estimated number of different directions from which reflected waves are incident on the array antenna) is deduced from the number of the eigenvalues that are greater than thermal noise power level. In addition, the eigenvectors $e_1 \sim e_m$ corresponding to the eigenvalues $\lambda 1 \sim \lambda m$ are calculated.

In general, the correlation array Rxx will be compensated, based on time-domain averaging or spatial-domain averaging of that correlation array, to obtain a compensated correlation array Rxx'. The eigenvalues $\lambda 1 \sim \lambda m$ of the correlation array Rxx' are then derived, and the incident wave number L is deduced from the number of these eigenvalues that exceed thermal noise power level, with the eigenvectors $e_1 \sim e_m$ corresponding to these eigenvalues $\lambda 1 \sim \lambda m$ then being calculated.

After calculating the eigenvectors $e_1 \sim e_m$, a noise eigenvector $E_N$ is defined, using equation (7) below. The noise eigenvector $E_N$ corresponds to the set of (M-L) eigenvalues that do not exceed thermal noise power level. An evaluation function $P_{mu}(\Theta)$ is then obtained, from equation (8) below, in which a $(\Theta)$ denotes the complex response of the array antenna with respect to the direction $\Theta$, where $\Theta$ is defined as an amount of angular displacement from the orientation direction of the array antenna.

$$E_N = (e_{L+1}, e_{L+2}, \ldots, e_M) \qquad (7)$$

$$P_{MU} = \frac{a^H(\theta)a(\theta)}{a^H(\theta)E_N E_N^H a(\theta)} \qquad (8)$$

Figure 9B:
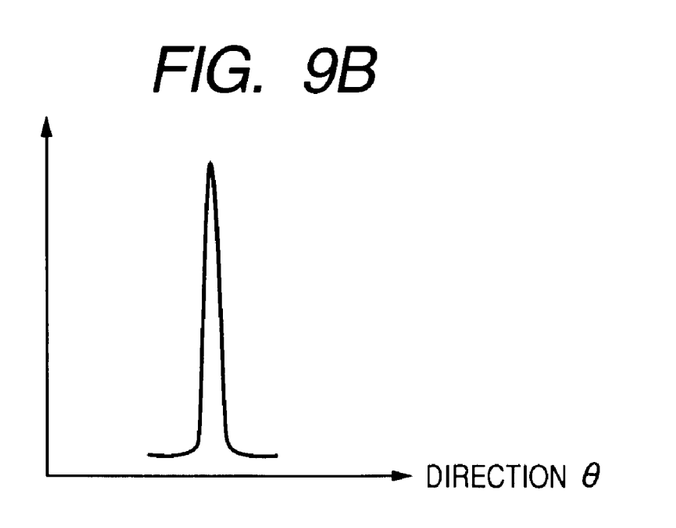
FIG. 9B is a corresponding diagram of a direction angle spectrum indicative of the direction of a target object.

As shown in FIG. 9B, a direction angle spectrum (MUSIC spectrum) is obtained from the evaluation function $P_{mu}(\Theta)$. Such a direction angle spectrum has a single sharp peak, which coincides with a specific direction theta of incident radar waves, i.e., the direction of the incident waves that resulted in the common peak shown in FIG. 9A.

When a plurality of common peaks (each as illustrated in FIG. 9) are concurrently detected, then each of the peaks is selected in turn, to derive a corresponding direction angle spectrum of the form shown in FIG. 9B.

Hence a number of different directions from which incident radar waves are arriving can be derives as respective sharp peaks in a MUSIC spectrum. Thus (on the assumption that the estimated wave number value L actually corresponds to the number of target objects), the respective directions of the target objects in relation to the orientation direction of the antenna can be calculated.

When such a type of radar apparatus is mounted on a vehicle, it is necessary to attach the radar apparatus to the vehicle such that the orientation direction (as defined above) of the antenna is accurately aligned with the direction of motion of the vehicle, i.e., coinciding with the longitudinal central axis of the vehicle. This is due to the fact that the radar apparatus derives the direction of a target object by using coordinates which have the orientation direction of the antenna as a reference. If the relationship between this coordinate system and the vehicle position coordinates is not fixedly predetermined, then it is not possible to use the vehicle as a reference for evaluating the detected position and direction, etc., of a target object, in order to control the vehicle in accordance with such detection information.

Hence it has been usual practice, when installing a radar apparatus on a vehicle, to position a target object consisting of a radar reflector ahead of the vehicle, aligned with the central longitudinal axis of the vehicle. The orientation of the array antenna of the radar apparatus is then adjusted until the detected direction that is obtained for the radar reflector by the radar apparatus coincides with the actual known direction, i.e., so that the detected direction of the reflector becomes 0°.

However in practice, the direction detection results that are obtained from such a type of apparatus are affected by factors such as electrical noise, etc., causing the detected direction obtained for a stationary target object to vary substantially with time. Hence the problem arises with such an adjustment method that, if the antenna orientation is adjusted while observing the direction detection results (i.e., to attempt to adjust the detected direction to coincide with the actual known direction of a target object such as a radar reflector), it is difficult or impossible to perform the adjustment to a sufficiently high degree of accuracy.

SUMMARY OF THE INVENTION

It is an objective of the present invention to overcome the above problems by providing a method and apparatus for enabling the orientation direction of an array antenna of a direction detection apparatus to be accurately adjusted in relation to a specific coordinate system.

To achieve the above objectives, the invention provides a method of adjusting the orientation direction of an array antenna, which is applicable to a direction detection apparatus that transmits radar waves, receives resultant reflected incident waves from one or more target objects, estimates the total number of these target objects, and calculates respective directions of the incident waves (i.e., representing respective directions of the target objects) based on the assumption that the estimated number of incident wave directions is correct. To adjust the array antenna orientation direction, one or more target objects (in general, a single target object, i.e., radar reflector) are disposed at respective predetermined directions from the array antenna, and (when set in an antenna adjustment mode of operation) the direction detection apparatus is controlled to calculate the incident wave directions based on the actual known number of target objects, rather than on an estimated number. In that way, stable calculation of the incident wave directions can be achieved by the apparatus, free from time axis variations in the detected directions, so that the amount of deviation between the detected directions and the actual directions can be accurately obtained. Hence, the angular position of the array antenna can be quickly and accurately adjusted to bring the amount of deviation to zero, thereby accurately adjusting the orientation direction of the antenna.

Preferably, a single target object (radar reflector) is used for performing such adjustment, with the reflector being disposed at a direction from the array antenna that corresponds to the reference (0°) direction of the antenna. In that case, information expressing the incident wave direction obtained by the direction detection apparatus can be monitored by a user while performing adjustment of the array antenna orientation. The user can thereby readily determine the extent to which the calculated incident wave direction differs from the reference direction. The angular position of the array antenna can thus be adjusted to bring that extent of difference towards zero.

The advantages of the invention are based upon the fact that the aforementioned fluctuations which occur with time, for the detected direction of a target object, can be substantially entirely eliminated if the direction detection apparatus calculates the direction of the target object on the basis that there is only a single target object, rather than deriving an estimated number of potential target objects and performing direction calculations based on the assumption of that estimated number of target objects.

Hence, a displayed amount of deviation of a detected direction from the actual direction of a target object, when observed by a user, can be utilized by the user to accurately adjust the array antenna orientation.

Preferably, an electronic apparatus that is separate from the direction detection apparatus (i.e., an adjustment/test tool) is employed for performing such array antenna adjustment. Such an external apparatus is configured to be capable of data communication with the direction detection apparatus, by means of a cable connection or by wireless communication. The external apparatus is configured to receive calculated incident wave direction information from the direction detection apparatus and is provided with a display device for displaying the contents of the incident wave direction information to a user. In addition, the external apparatus is preferably configured to enable the user to input commands for designating a number of target objects that are located at respective predetermined directions (where the number will in general be 1), and for selectively designating that the direction detection apparatus is to operate in:

(a) a normal mode, in which respective incident wave directions are calculated for an estimated number of incident wave directions (the estimated value of the parameter L described above), or (b) an antenna adjustment mode, in which the direction detection apparatus does not perform estimation of the number of target objects, and in which incident wave directions are calculated based upon an actual number of target objects (in general, a pre-positioned radar reflector constituting a single target object, as described above), with that number being set as the value of the parameter L.

The external apparatus is configured to transmit command signals to the direction detection apparatus, corresponding to these commands that are inputted by the user, for causing the direction detection apparatus to begin to operate in the specified mode. Hence, when the user has established the antenna adjustment mode, the array antenna can be adjusted by the user while observing the direction information appearing on the display device, until the direction that is calculated by the direction detection apparatus coincides with the actual direction (e.g., reference 0° direction) of the pre-positioned reflector.

The invention is for example applicable to a direction detection apparatus that is mounted on a vehicle, for detecting the directions of target objects that are located ahead of the vehicle. In that case, the orientation direction of the array antenna can be accurately adjusted in relation to a coordinate system that is defined by the body of the vehicle.

The invention is described more specifically in the following description, referring to preferred embodiments.

BRIEF DESCRIPTION OF THE DRAWINGS

FIG. 7A illustrates an example of a position relationship between the radar reflector and the radar apparatus, while

DESCRIPTION OF PREFERRED EMBODIMENTS

Figure 1:
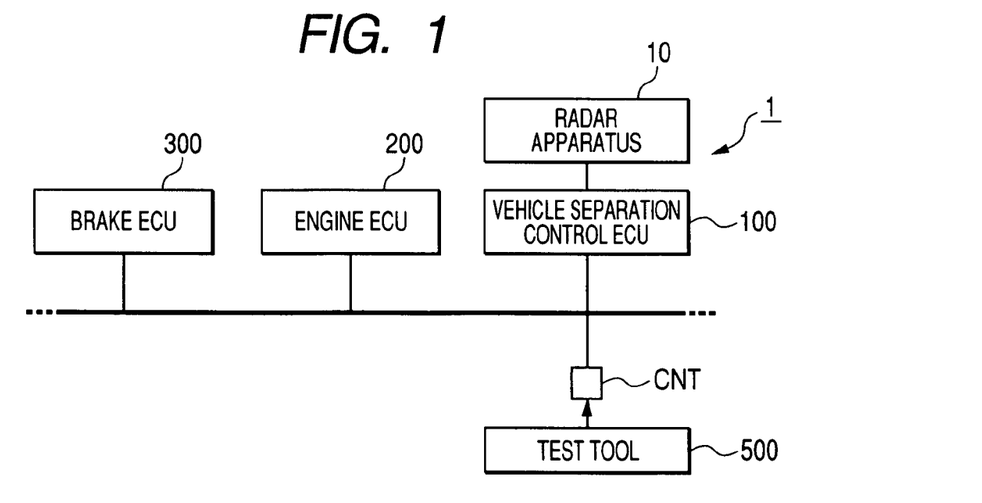
FIG. 1 is a general block diagram of a vehicle system.

An embodiment of an apparatus utilizing an antenna orientation adjustment method according to the present invention will be described in the following, referring first to FIGS. 1 and 2. FIG. 1 is a general block diagram of a vehicle control system 1, which includes a vehicle separation control ECU 100, a engine ECU 200, and a brake ECU 300, which incorporate respective ECUs (electronic control units) which communicate via a in-vehicle LAN (local area network). Each of the ECUs is based on a microcomputer and a communication interface for performing communication with other ECUs that are connected to the LAN, to execute processing sequences in cooperation with the other ECUs.

The vehicle separation control ECU 100 is connected to a radar apparatus 10, with details of the vehicle separation control ECU 100 and radar apparatus 10 being shown in FIG. 2. As shown, the vehicle separation control ECU 100 includes a control section 101 and a communication interface 103. As described hereinafter, the radar apparatus 10 derives (for each of one or more target objects) information that expresses the distance to the target object and the relative velocity and direction (with respect to the antenna 19 of the radar apparatus 10) of the target object, with that information being supplied to the vehicle separation control ECU 100. The vehicle separation control ECU 100 also acquires from the engine ECU 200 and brake ECU 300 information concerning the running condition of the vehicle, i.e., concerning the vehicle brakes and the engine operating status. Bases on these sets of information, the vehicle separation control ECU 100 supplies control information to the engine ECU 200 and the brake ECU 300, to perform control of the vehicle in cooperation with the engine ECU 200 and the brake ECU 300.

The vehicle separation control ECU 100 is also connected to a warning buzzer (not shown in the drawings) for activating the buzzer to emit an audible warning signal when necessary, in response to target object information received from the radar apparatus 10.

The engine ECU 200 controls the vehicle engine based upon information concerning the degree of accelerator actuation, the degree of opening of the engine throttle, etc. In particular, the engine ECU 200 transmits to the vehicle separation control ECU 100 information expressing the running condition of the vehicle, i.e., the vehicle speed, the throttle degree of opening, the accelerator condition (e.g., degree of actuation of the accelerator pedal), etc., with the information being derived from respective sensors (not shown in the drawings) that are connected to the engine ECU 200. In addition, the engine ECU 200 is configured to receive information relating to engine control such as a target value of acceleration, fuel reduction requests, etc., and to perform engine control based on such information.

The brake ECU 300 is configured to control the vehicle brakes, based on the degree of actuation of the brake pedal, etc. The brake ECU 300 also transmits information to the vehicle separation control ECU 100 that expresses the running condition of the vehicle, i.e., information concerning the steering angle, the yaw rate, the brake pedal condition, with that information being derived from respective sensors (not shown in the drawings) that are connected to the brake ECU 300. The brake ECU 300 also receives (from the vehicle separation control ECU 100) information relating to braking control, such as a target value of acceleration, braking requests, etc., and controls the brakes based on the information.

The in-vehicle LAN includes a connector CNT, for connecting external equipment to the LAN. Specifically, a test tool 500 can be connected to the LAN and hence to the radar apparatus 10 via the connector CNT, with the test tool 500 being used to perform adjustment of the orientation direction of the radar apparatus 10 (more specifically, of a receiving antenna 19 of the radar apparatus 10) with respect to the vehicle, as described hereinafter, or for testing the radar apparatus 10.

Figure 5A:
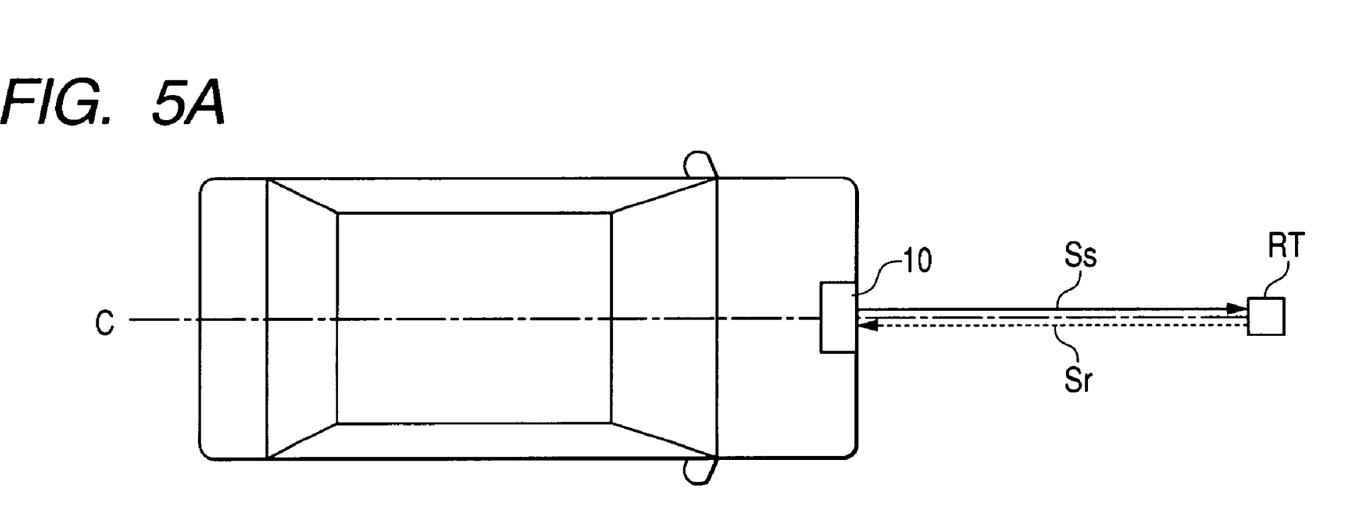
FIGS. 5A, 5B are diagrams for illustrating the disposition of a radar reflector in relation to a vehicle equipped with the radar apparatus of FIG. 2.
Figure 5B:
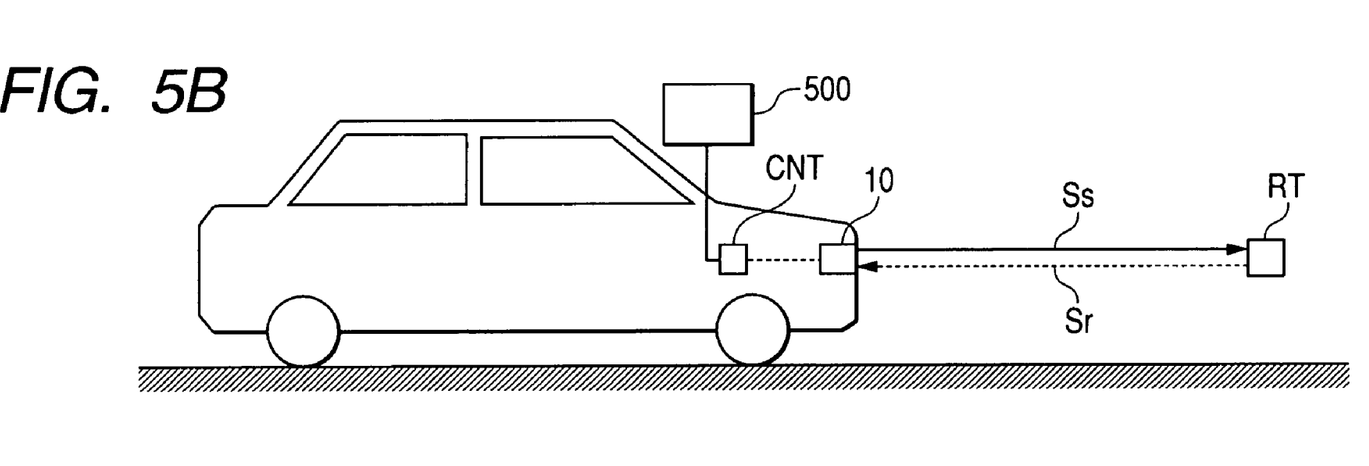

The configuration of the radar apparatus 10 will be described in the following, referring to FIG. 2. With this embodiment, the radar apparatus 10 is a millimeter-wave radar apparatus which utilizes FMCW modulation, to transmit and receive frequency-modulated radar waves that are in the millimeter-wave range, for detecting the distance, relative velocity and direction of a target object. The radar apparatus 10 is mounted at the front of a vehicle (as shown in FIGS. 5A, 5B), and the orientation direction of the receiving antenna 19 of the radar apparatus 10 is adjusted to coincide with the central longitudinal axis of the vehicle (indicated by line C in FIG. 5A).

As shown in FIG. 2, the radar apparatus 10 includes an oscillator 11, an amplifier 13, a signal splitter 15, a transmitting antenna 17 and a receiving antenna 19. The oscillator 11 generates a high-frequency signal in the millimeter-wave frequency range, frequency-modulated as described above referring to FIGS. 8B, 8C, i.e., alternately linearly increasing in frequency and linearly decreasing in frequency in successive intervals (the rising intervals and falling intervals as defined hereinabove). The amplifier 13 amplifies the high-frequency modulated signal produced by the oscillator 11, with the resultant output signal from the amplifier 13 being applied as a local oscillator signal LO to a mixer 25 and supplies as the transmission signal Ss to the transmitting antenna 17, for transmitting radar waves.

The receiving antenna 19 is made up of M antenna elements, for receiving reflected radar waves from a target object. The signal channels allocated for transferring the respective received signals of the M antenna elements are designated as CH_1~CH_M.

The radar apparatus 10 also includes a received signal switch 21 which is controlled to successively select the signal channels of respective ones of the antenna elements, and supply the received signal Sr of the selected antenna element to an amplifier 13. The amplifier 13 amplifies the received signal Sr, and supplies the amplified received signal to the mixer 25, to be mixed with the local oscillator signal LO, to obtain the beat signal BT. The radar apparatus 10 further includes a filter 27, a A/D converter 29 and a signal processing section 30. The filter 27 removes extraneous signal components from the beat signal BT, while the A/D converter 29 periodically samples the resultant filtered signal produced from the filter 27, to convert that signal to digital data. The signal processing section 30 operates on the digital data from the A/D converter 29, to calculate the distance, relative velocity and direction of a target object, with these being expressed by target object information that is then supplied by the signal processing section 30 to the vehicle separation control ECU 100.

The M antenna elements of the receiving antenna 19 are arrayed in a straight line at regular spacings, with each of the antenna elements having a beam width that is within the overall beam width of the receiving antenna 19.

The signal processing section 30 is based on a usual type of microcomputer, operated as a DSP (digital signal processor) which performs high-speed FFT (fast Fourier transform) processing of data supplied from the A/D converter 29.

With the radar apparatus 10 of this embodiment, when the oscillator 11 is activated in response to a command from the signal processing section 30, the high-frequency signal that is generated by the oscillator 11 and amplified by the amplifier 13 is distributed by the signal splitter 15 as the transmission signal Ss and the local oscillator signal LO as described above, with the transmission signal Ss being transmitted as radar waves by the transmitting antenna 17.

Radar waves that are reflected from a target object after having been transmitted from the transmitting antenna 17 and which return to the receiving antenna 19 are received by the respective antenna elements of the receiving antenna 19. The received signal Sr (from the one of the channels CH_1~CH_M that is currently selected by the received signal switch 21) is amplified by the amplifier 13, and the amplified received signal is supplied to the mixer 25 to be mixed with the local oscillator signal LO and thereby obtain the beat signal BT. After extraneous signal components have been removed from the beat signal BT by the filter 27, it is sampled by the A/D converter 29 to be converted to a corresponding digital signal that is inputted to the signal processing section 30.

During each modulation period of the radar waves (i.e., with each modulation period consisting of a rising interval followed by a falling interval, as described above referring to FIG. 8B) the received signal switch 21 successively selects each of the channels CH_1~CH_M, with this selection operation being repeated cyclically a plurality of times during the modulation period (e.g., 512 times). The A/D converter 29 performs sampling in synchronism with the changeover timings of the received signal switch 21. That is to say, during each modulation period, the signal processing section 30 stores sampled data obtained for each of the channels CH_1~CH_M, with respective sets of data being stored for the successively occurring rising interval and falling interval which constitute a modulation period.

In the signal processing section 30, each time that a rising interval or a falling interval of a modulation period is completed, a FFT (fast Fourier transform) processing section 31 performs FFT processing of the data samples that have been acquired and stored during that interval. This FFT processing is performed on the data of each of the channels CH_1~CH_M and is performed respectively separately for the rising interval and the falling interval of a modulation period. When this processing is performed for the m-th one of the channels CH_1~CH_M, then designating the sampled data obtained for that channel as $D_m$, the corresponding Fourier transform value $F[D_m]$ is calculated.

Figure 3:
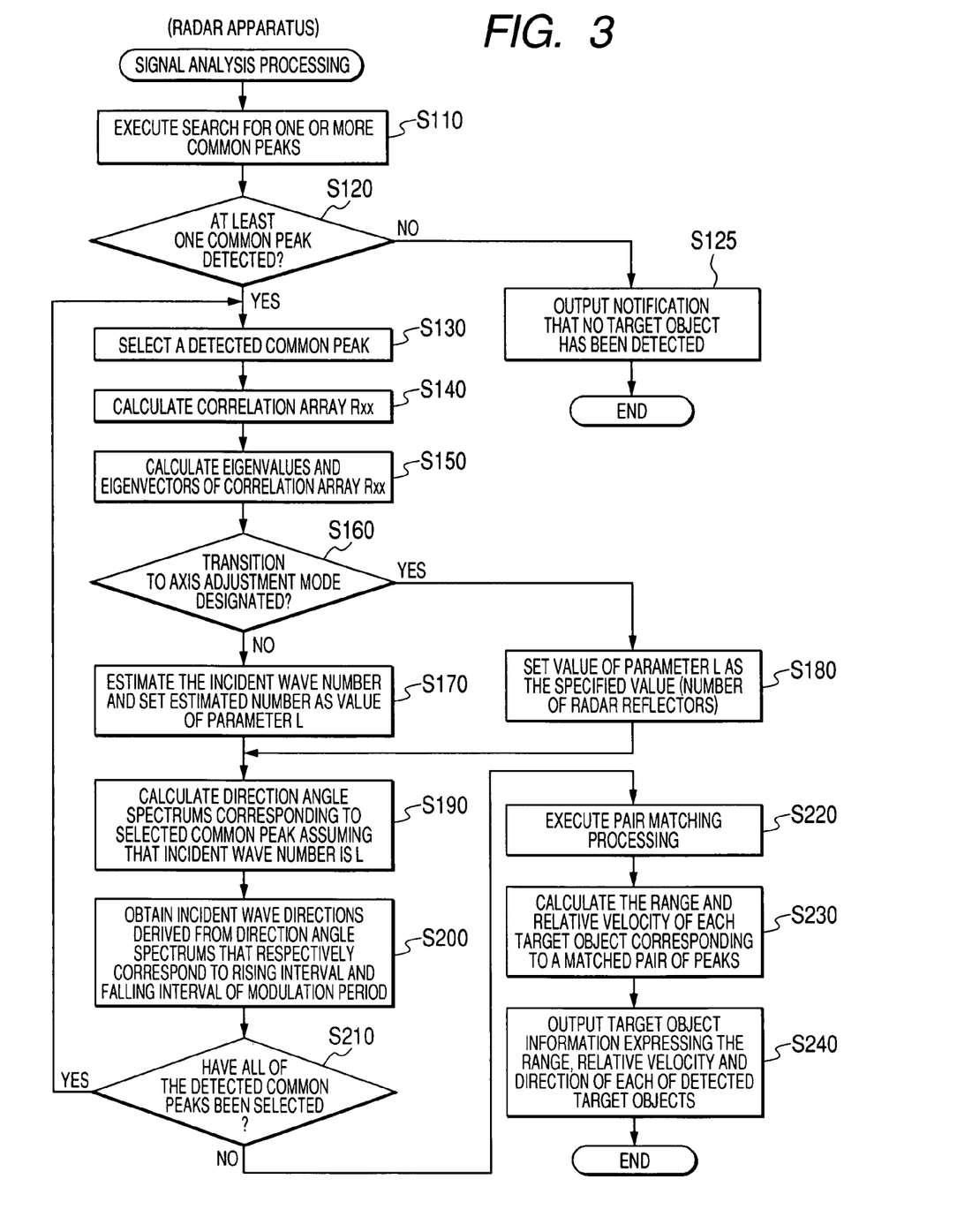
FIG. 3 is a flow diagram of processing executed by a signal processing section of the radar apparatus of FIG. 2.

In addition, a signal analysis section 33 of the signal processing section 30 performs the signal analysis processing shown in the flow diagram of FIG. 3, to obtain the distance R, the relative velocity V (i.e., with respect to the radar apparatus 10), and the direction (as an angular amount defined with respect to the orientation direction of the receiving antenna 19 as described above) of a target object. The processing routine of FIG. 3 is repetitively executed by the signal processing section 30 in correspondence with respective modulation periods.

For brevity of description in the following, the respective received signals that are transferred via the channels CH_1~CH_M as described above will be referred to simply as the channels CH_1~CH_M. At the start of this signal analysis processing routine, the signal analysis section 33 acquires the FFT processing results (Fourier transform values $F[D_m]$) that are derived by the signal processing section 30 for the channels CH_1~CH_M. The signal analysis section 33 then searches (S110) for a power peak that is common to each of the channels CH_1~CH_M, and which occurs in both the rising interval and the falling interval of the modulation period concerned, with the search being based on the respective frequency spectrums of these channels as described above referring to FIG. 9A. This search is performed separately for each channel and for the rising interval and for the falling interval of the modulation period concerned.

The term "power peak" here signifies a peak in a power/frequency spectrum that exceeds a predetermined threshold level of power. The center frequency of a peak will be referred to as the peak frequency. Designating a complete modulation period as a cycle, it would be equally possible to perform this search based on Fourier transform results that were obtained in the preceding cycle, or on Fourier transform results that were obtained in a plurality of preceding cycles. That is to say, in the latter case, a plurality of successively derived power/frequency spectrums would be integrated, to obtain an integrated spectrum that would be searched for a power peak.

If one or more common peaks are detected by the search performed in step S110, which each satisfy the conditions described above (YES in step S120), the signal analysis section 33 executes step S130. However if no such common peak is found then step S125 is executed, in which the signal processing section 30 sends information to the vehicle separation control ECU 100 for reporting that no target object is detected. This execution of the signal processing routine is then ended.

If there is a YES decision in step S120, then since there may be a plurality of common peaks found in step S110, step S130 is performed in which the signal analysis section 33 selects one of that plurality of peaks. Next in step S140, a Fourier transform $F[D_m]$ is calculated. This is the Fourier transform of the peak frequency value that obtained (i.e., corresponding to the selected peak) for the m-th channel, and is calculated for each of the channels, to obtain an array of data constituting the received vector X. A correlation array Rxx (having M row and M columns) is then calculated based on the received vector X as described hereinabove.

After deriving the correlation array Rxx, the eigenvalues $\lambda 1 \sim \lambda n$ of that array are calculated, and the eigenvectors corresponding to these eigenvalues are calculated (step S150). On completion of this processing, the signal analysis section 33 judges whether the axis adjustment mode has been set for the radar apparatus 10, i.e., in which a user can adjust the orientation of the radar apparatus 10 (receiving antenna 19) while observing detected direction information as described hereinafter (step S160). If that mode is not set (NO in step S160) then since this indicates that the normal mode of operation of the radar apparatus 10 has been set, an estimated incident wave number (i.e., estimated number of respectively different directions from which incident reflected waves are arriving) is derived from the number of eigenvalues which are greater than thermal noise level, with that incident wave number being set as the parameter L (step S170). For example, the incident wave number can be deduces as the number of eigenvalues which are greater than a predetermined threshold value, to thereby set the value of the parameter L.

Operation proceeds to step S190.

However if it is found that the axis adjustment mode has been established for the radar apparatus 10 (YES in step S160) then the signal analysis section 33 sets the parameter L as a fixed value that has been supplied from the vehicle separation control ECU 100 when the axis adjustment mode was established (step S180), with this value having been specified beforehand as described hereinafter. Operation then proceeds to step S190.

In S190, the signal analysis section 33 derives an angle spectrum (MUSIC spectrum) corresponding to the aforementioned selected common peak, with the calculation based on the assumption that the incident wave number (number of incident wave directions) is the value that has been set for the parameter L. Specifically, using the value (estimated, or fixedly preset) that has been set for L, equation (7) above is used to define a noise eigenvalue vector $E_N$ formed of the eigenvector $e_{L+1} \sim e_M$ corresponding to (M-L) eigenvalues. The signal analysis section 33 then derives an evaluation function $P_{MU}(\Theta)$ using equation (8) above, which expresses the complex response of the array antenna with respect to a direction $\Theta$, and thereby obtains the direction angle spectrum (MUSIC spectrum) that corresponds to the selected common peak.

From the MUSIC spectrum, the signal analysis section 33 detects a peak value corresponding to a specific direction angle, as an incident wave direction that corresponds to the common peak which was selected in step S130.

After performing this direction detection, operation proceeds to step S210, in which a decision is made as to whether any of the peaks that were detected in step S110 have not yet been selected. If there are any such non-selected peaks, then operation returns to step S130, in which a peak that has not yet been selected is selected, and the processing of steps S140 onward described above is then repeated. More specifically, the processing of steps S130 to S200 is performed, for each selected common peak, first for the rising interval and then for the falling interval of the modulation period concerned. Ideally, the respective directions that are obtained in step S200 for the rising interval and for the falling interval, respectively, should be identical.

If it is judged in step S210, that directions have been obtained corresponding to all of the detected common peaks, for both the rising interval and falling interval of the modulation period concerned (NO in S210), operation proceeds to step S220 in which pair matching processing is performed. In S220 the signal analysis section 33 selects pairs of matched common peaks. Each of these is a pair of common peaks that were respectively detected in the rising interval and also in the falling interval of the modulation period concerned, and for which the corresponding derived directions (obtained in step S200 as described above) do not differ by more than a predetermined amount. Each such pair of peaks are assumed to correspond to a single target object.

Next, based on a pair of peaks selected by the pair matching processing, the signal analysis section 33 derives information specifying the distance R and the relative velocity V and of the corresponding target object (with respect to the radar apparatus 10). This is done by applying the respective frequency values (i.e., beat frequency values) of the matched pair of peaks, using equations (1)~(4) above (step S230).

On completion of this processing, the signal analysis section 33 derives an average direction theta for that peak pair (i.e., if an identical direction has not been derived corresponding to each of the peaks in the pair). The above processing is repeated for each of respective pairs of peaks, and each set of obtained values for R, V and theta that are obtained from each peak pair are transmitted to the vehicle separation control ECU 100, as information expressing the distance, relative velocity and direction of a different target object (step S240).

On completion of the processing of step S240 for all of the peak pairs that have been selected in step S220, execution of the processing routine of FIG. 3 is ended.

Figure 4:
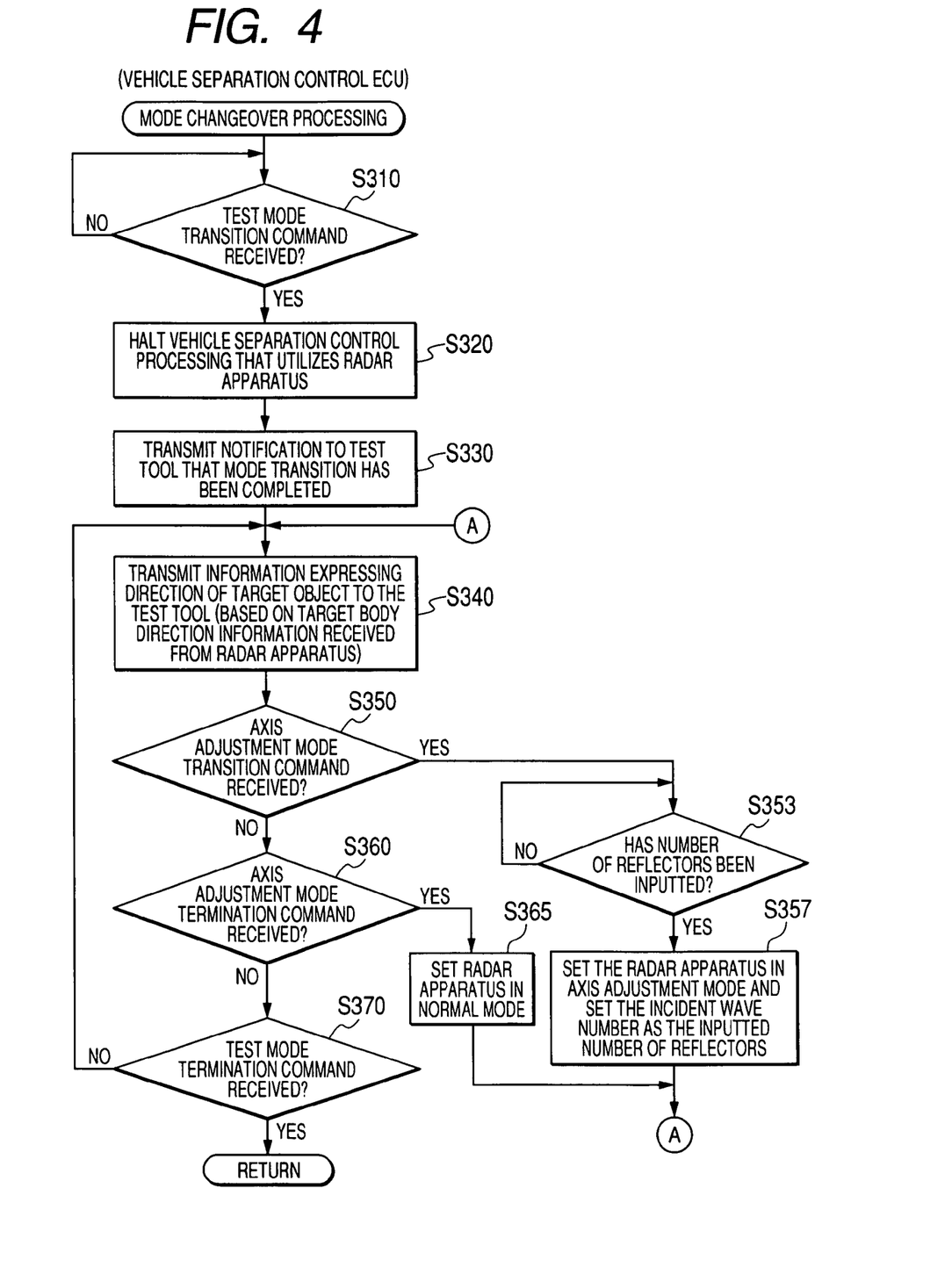
FIG. 4 is a flow diagram of a mode changeover processing routine that is repetitively executed by a control section 101 of a vehicle separation control ECU 100 in the vehicle system of FIG. 1.

Based on the information thus received from the radar apparatus 10, the vehicle separation control ECU 100 generates control information for controlling the engine and brakes of the vehicle, and transmits the control information to the engine ECU 200 and the brake ECU 300. In addition, the vehicle separation control ECU 100 is configured to respond to receiving a changeover command from the test tool 500 for executing changeover of the operating mode of the radar apparatus 10. FIG. 4 is a flow diagram of a mode changeover processing routine that is executed by the vehicle separation control ECU 100. This processing routine is periodically executed by the control section 101 of the vehicle separation control ECU 100 so long as the vehicle separation control ECU 100 is in operation.

When mode changeover processing begins, the control section 101 first waits until a test mode transition command is inputted from the test tool 500 via the in-vehicle LAN (S310). When a test mode transition command is inputted (YES in S310), processing relating to vehicle control by use of the radar apparatus 10 is halted (S320). In that way, safety is ensured, by arranging that mode changeover processing will only be performed by the control section 101 during a condition in which processing (using information generated by the radar apparatus 10) relating to vehicle control is halted.

When the processing of step S320 is completed, the control section 101 transmits information to the test tool 500 (which originated the test mode transition command), via the in-vehicle LAN, notifying that transition to the test mode has been completed (S330). Next (S340), target object direction information that has been received from the radar apparatus 10 is transmitted via the in-vehicle LAN to the test tool 500. While this target object information is being transmitted, a decision is made as to whether an axis adjustment mode transition command, or an axis adjustment mode termination command, or a test mode termination command, has been received from the test tool 500 (steps S360, S360, S370 respectively), i.e., whether the operator of the test tool 500 has inputted such a command. If none of these commands has been received (NO in each of steps S360, S360, S370) then the processing for transmitting target object direction information to the test tool 500 is continued. In that way, the transfer of the direction information is continued until completion.

However in that condition, if a test mode termination command is received from the test tool 500 via the in-vehicle LAN (YES in S370) then the control section 101 temporarily halts the current processing, and returns to step S310 to wait for a test mode transition command to be inputted (with the latter return operation being indicated as "RETURN" in FIG. 4).

If an axis adjustment mode transition command is inputted (YES in step S350), then the control section 101 waits to receive a value (from the test tool 500, via the in-vehicle LAN) specifying the number of reflectors that have been set up ahead of the vehicle, for use during axis adjustment operations on the radar apparatus 10 (S353), i.e., as the value of the aforementioned parameter L, used in direction calculations as described above. When this value is received, the radar apparatus 10 is set in the axis adjustment mode, and processing is performed for setting the parameter L (incident wave number) as the specified number of reflectors (S357). Operation then proceeds to step S340. With this embodiment, only a single reflector is utilized, so that the parameter L is set as 1 during operation in the axis adjustment mode.

When the radar apparatus 10 is set in the axis adjustment mode, target object direction calculation is performed on the basis (assumption) that the incident wave number (parameter L) is a specific known value, i.e., equal to the specified number of reflectors. The resultant calculated target object direction information is supplied by the radar apparatus 10 to the vehicle separation control ECU 100 as target object information. Hence, while the axis adjustment mode is established, the control section 101 transmits information to the test tool 500 specifying the target object direction data derived by the radar apparatus 10, with that target object direction data having been derived by the radar apparatus 10 based upon the assumption that the incident wave number is a specific fixed value, that is to say, the actual number of reflectors, respectively located at predetermined known directions with respect to the antenna 19. This supplying of target object direction information to the test tool 500 is continued until operation in the axis adjustment mode is terminated.

In this condition, when an axis adjustment mode termination command is received from the test tool 500 as designated by the operator (YES in S360), the control section 101 changes the operation of the radar apparatus 10 from the axis adjustment mode to the normal mode (S365). Hence, operation then proceeds to step S340, and thereafter steps S340, S50, S360, S370 are cyclically executed, until a test mode termination command is received from the test tool 500 in S370, as designated by the operator.

Thus in this condition, until a mode transition command or a test mode termination command is inputted, the radar apparatus 10 continuously derives target object direction information based on calculations using an estimated incident wave number (value of parameter L) as described hereinabove, and the control section 101 transmits the derived direction information to the test tool 500.

The test tool 500 will be described in the following, referring to FIG. 2. As shown, the test tool 500 is made up of a control section 501, a communication interface 503, a operator input section 505 and a display section 507. The control section 501 performs overall internal control of the test tool 500, and is based on a microcomputer. The communication interface 503 is connected to the connector CNT (shown in FIG. 1), and enables communication with the vehicle separation control ECU 100. The operator input section 505 has keys which can be actuated by an operator for inputting commands or data, and the display section 507 is a liquid crystal display unit, etc.

The test tool 500 is connected to the vehicle separation control ECU 100 through the connector CNT when the radar apparatus 10 is being adjusted to a requisite orientation with respect to the vehicle. In this condition, based on target object direction information that is received from the radar apparatus 10 via the vehicle separation control ECU 100, the display section 507 displays target object direction information that is detected by the radar apparatus 10.

With this embodiment, after adjustment is completed, the radar apparatus 10 is fixedly attached at the front end of the vehicle, while the receiving antenna 19 is fixedly (permanently) attached to the radar apparatus 10 i.e., being fixed to a chassis or housing of an apparatus unit constituting the radar apparatus 10. As described above, target object directions are derived by the radar apparatus 10 with reference to the receiving antenna 19, and the vehicle separation control ECU 100 performs various types of vehicle control based on target object direction information supplied from the radar apparatus 10, on the assumption that the reference orientation direction of the receiving antenna 19 is aligned along the central axis C (front-to-rear longitudinal axis) of the vehicle, shown in FIG. 5A.

Thus for the vehicle separation control ECU 100 to perform satisfactory vehicle control, it is necessary that the radar apparatus 10 be attached to the vehicle such that the orientation direction of the receiving antenna 19 accurately coincides with the central axis C of the vehicle. This is achieved by establishing the axis adjustment mode, and using the test tool 500 in adjusting the orientation of the radar apparatus 10 as described in the following.

To perform this adjustment, a body that is suitable for use as a radar wave reflector RT is positioned ahead of the vehicle at a specific distance from the vehicle, located along the direction of the central axis C of the vehicle as illustrated in FIG. 5A (as viewed from above) and 5B (as seen in side view). In this condition, an operator connects the test tool 500 to the vehicle separation control ECU 100 by means of the connector CNT.

The operator can then actuate the operator input section 505 for inputting operation commands, such as a command designating that the vehicle separation control ECU 100 is to enter the test mode, whereby the test tool 500 transmits a test mode transition command to the vehicle separation control ECU 100 as described in the following.

Figure 6:
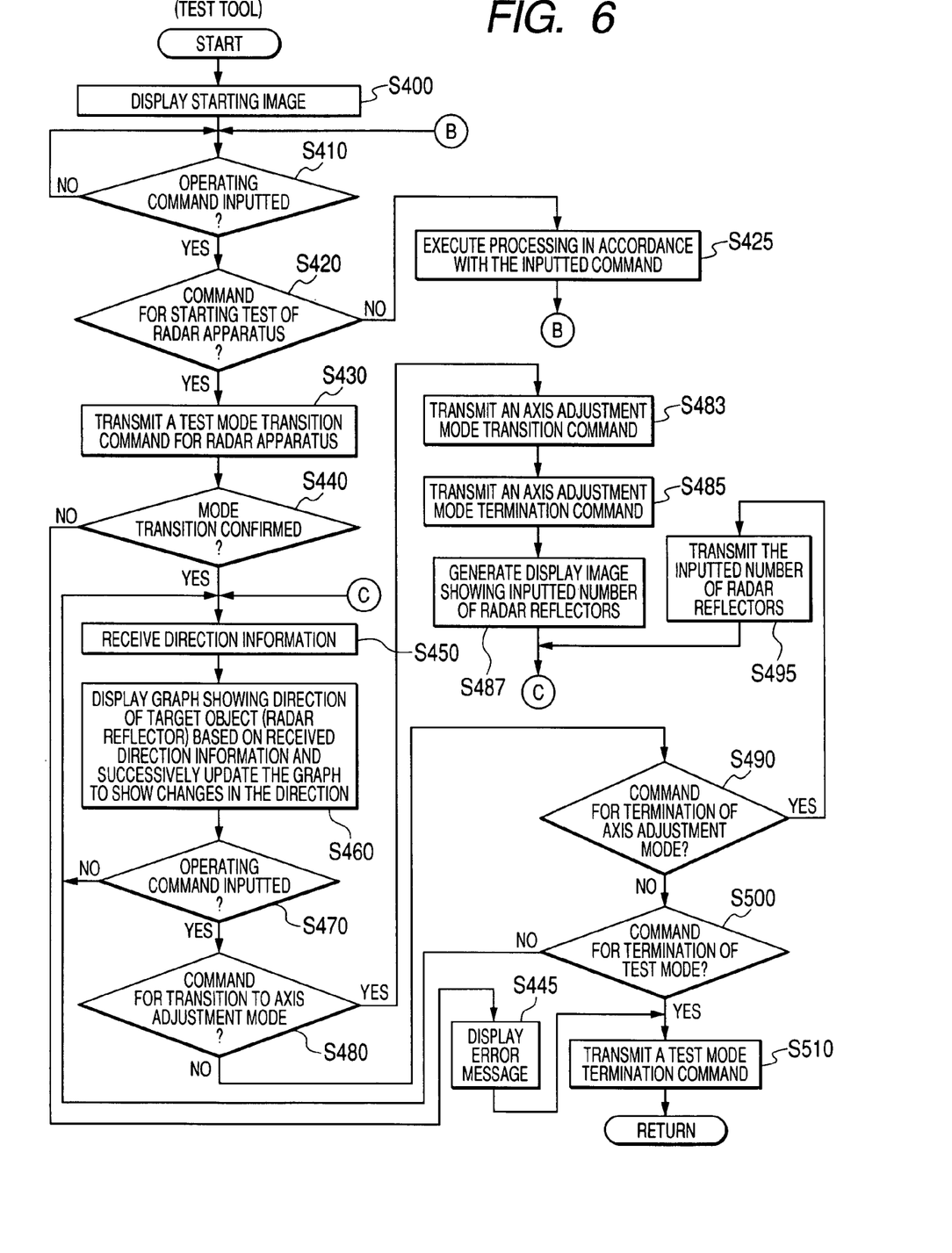
FIG. 6 is a flow diagram of a main processing routine that is repetitively executed by a control section 501 of a test tool 500 in the vehicle system of FIG. 1.

When power switch-on is performed for the test tool 500, the control section 501 of the test tool 500 thereafter repetitively executes a main processing routine that is shown in the flow diagram of FIG. 6. When the processing of FIG. 6 is started, then firstly the control section 501 controls the display section 507 to generate an initial image (Step S400). A wait is then performed, until the operator inputs an operation command, using the operator input section 505. When such a command is inputted, a decision is made as to whether this is an operation command designating changeover to the test mode. If so (YES decision in S420) then operation proceeds to step S430, while if there is a NO decision (i.e., the operator has inputted an operation command which is not a test mode transition command), then operation proceeds to step S425. In S425, processing for executing the processing corresponding to the inputted operation command is performed. Operation then returns to step S410, to wait for the next operation command.

When S430 is executed, the control section 501 transmits a test mode transition command to the vehicle separation control ECU 100, via the in-vehicle LAN, and then waits (step S440) to receive notification information from the vehicle separation control ECU 100 which confirms that changeover to the test mode has been completed. If such notification information is received within a predetermined time interval (YES in S440), then operation proceeds to step S450. If the notification information is not received within the predetermined time interval (NO decision in S440), then since this indicates failure of the vehicle separation control ECU 100 to enter the test mode, an error message indicative of this failure is generated and displayed by the display section 507 of the test tool 500 (step S445). Operation then proceeds to step S510, to transmit a test mode termination command to the vehicle separation control ECU 100.

When S450 is executed, the control section 501 receives target object direction information from the vehicle separation control ECU 100, via the in-vehicle LAN, and then (step S460) generates a graph on the display section 507 showing the variation of target object direction with time, and thereafter repetitively executes processing for updating the contents of that displayed graph.

In each interval in which the graph displayed by the display section 507 is being updated, a decision is made as to whether an operation command has been inputted from the operator input section 505 (step S470). If so (YES in S470) the processing corresponding to that command is executed.

Specifically, if the operation command designates changeover to the axis adjustment mode (YES in S480) then the control section 501 executes step S483, to transmit an axis adjustment mode transition command to the vehicle separation control ECU 100 via the in-vehicle LAN. An image is then generated and displayed on the display section 507, showing the number of reflectors that have been positioned ahead of the vehicle as described above (step S485), with this number having been inputted by the operator through the operator input section 505.

In addition, when the number of reflectors is inputted by the operator, that number value is transmitted by the test tool 500 to the vehicle separation control ECU 100 via the in-vehicle LAN (step S487). When that processing is completed, step S450 is returned to, and the processing for updating the displayed graph (S460) is thereafter repetitively executed.

Prior to the time at which an operation command is generated which designates changeover to the axis adjustment mode as described above (i.e., so that there is a YES decision in S480 and S487 is then executed), the display section 507 displays the target object direction detection results obtained by the radar apparatus 10 when operating in its normal mode. However after step S487 has been executed, the radar apparatus 10 changes from the normal mode to the axis adjustment mode, and the display section 507 thereafter displays (as the graph) the target object direction detection results that are obtained by the radar apparatus 10 in the axis adjustment mode, by repetitive execution of the sequence of steps S480, S490, S500.

If an operation command is generated which does not designate changeover to the axis adjustment mode (NO decision in step S480), and which designates that the axis adjustment mode is to be ended (YES in step S490), then operation proceeds to step S495 in which the test tool 500 transmits an axis adjustment mode termination command to the vehicle separation control ECU 100 via the in-vehicle LAN. The operation of the radar apparatus 10 is thereby returned to the normal mode. The processing by the control section 501 then returns to step S450, and thereafter the display section 507 displays the graph showing the target object direction detection results obtained by the radar apparatus 10 when operating in its normal mode, so long as a NO decision is reached in each of repetitive executions of steps S480, S490, S500.

If an operation command is inputted which does not designate entering the axis adjustment mode or termination of the axis adjustment mode (NO decision in each of S480, S490) then a decision is made in S500 as to whether the user has inputted an operation command which designates that the instruction mode is to be terminated. If so (YES decision in S500), step S510 is executed in which the test tool 500 transmits a test mode termination command to the vehicle separation control ECU 100 via the in-vehicle LAN.

This execution of the main routine is then ended, and operation returns to the start of the main routine (S400).

It can thus be understood that when the test mode is designated, the test tool 500 of this embodiment utilizes the display section 507 to display a graph indicating detected target object direction information that has been derived by the radar apparatus 10 when operating in its normal mode. When the operator designates changeover to the axis adjustment mode, the radar apparatus 10 is caused to change from its normal operating mode to the axis adjustment mode, and thereafter the display section 507 displays a graph indicating detected target object direction information that has been derived by the radar apparatus 10 when operating in the axis adjustment mode. In this condition, the operator can accurately adjust the orientation of the radar apparatus 10 (and hence, of the receiving antenna 19, as described above) by performing this adjustment while observing the results of the adjustment, i.e., as changes in the graph that is displayed by the display section 507.

The orientation direction of the receiving antenna 19 can thereby be accurately aligned with the central axis C of the vehicle on which it is mounted, and the 10× then fixedly attached to the vehicle.

Figure 7A:
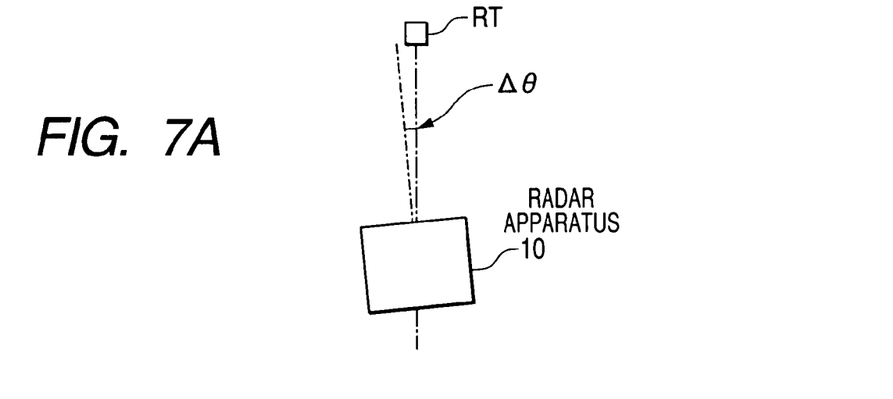

More specifically, with this embodiment a single reflector RT is used, disposed ahead of the vehicle on the central axis C of the vehicle as illustrated in FIGS. 5A, 5B and 7A. Firstly the radar apparatus 10 is provisionally attached at the front end of the vehicle (i.e., such as to be moveable for adjusting the orientation direction of the receiving antenna 19), such that the orientation direction of the receiving antenna 19 is approximately aligned along the central axis C. With the test tool 500 connected to the vehicle separation control ECU 100 by the connector CNT, the operator inputs to the test tool 500 an operating command designating that the operating mode is to be set as the test mode.

As a result, the display section 507 of the test tool 500 displays the estimated direction of the reflector RT as detected by the radar apparatus 10 when operating in the normal mode. In general, in this condition, there will be an error such as the angular error $\Delta\Theta$ in the detected direction, representing an amount of deviation $\Delta\Theta$ of the antenna orientation direction from the direction of the central axis C.

Figure 7B:
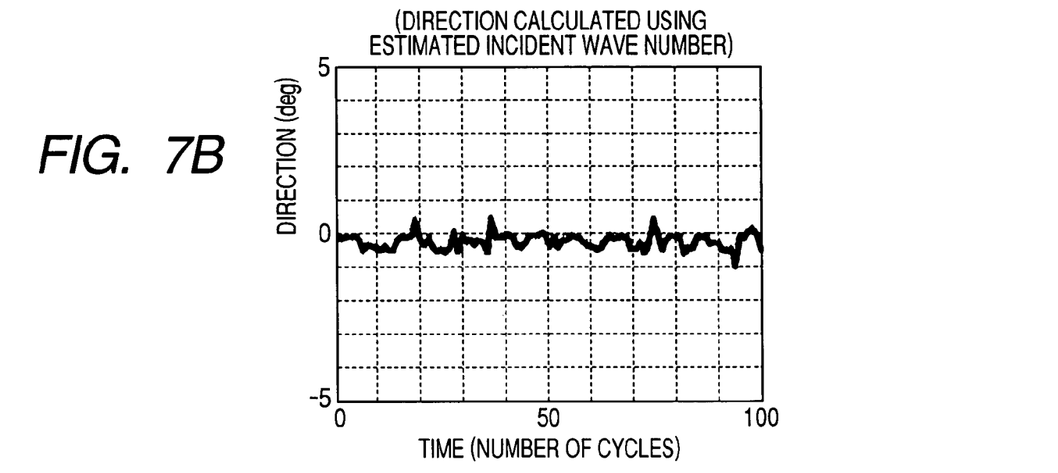
FIG. 7B shows an example of a display of direction detection results corresponding to FIG. 7A, obtained when the radar apparatus is operating in a normal mode.

FIG. 7B illustrates an example of the result which might be displayed by the display section 507 of the test tool 500 at this time. As shown, since the radar apparatus 10 is operating in the normal mode and so is searching for a possible plurality of respective directions of more than one target object, there are substantial time axis variations in the estimated direction information that is derived by the radar apparatus 10. The amplitude of these variations may exceed the angular error $\Delta\Theta$, in which case it would be impossible for the operator to use the results displayed by the display section 507 for assistance in accurately adjusting the orientation of the receiving antenna 19, since it would not be possible to use the displayed graph for confirming that the detected direction accurately coincides with the central axis C.

Figure 7C:
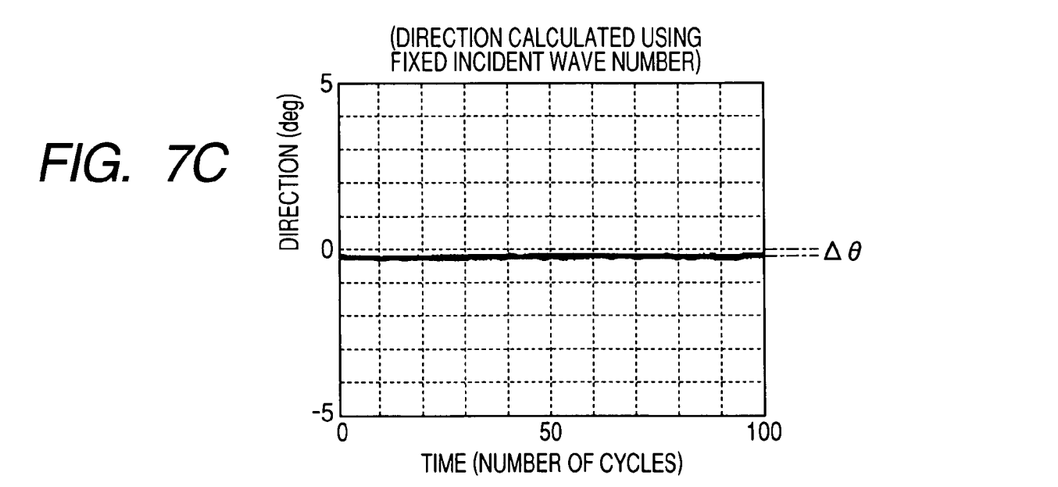
FIG. 7C shows a corresponding display of direction detection results obtained when operating in an axis adjustment mode.

For that reason, with this embodiment, the operator can utilize the test tool 500 to input the aforementioned operation command for designating changeover to the axis adjustment mode. When the radar apparatus 10 thereby changes from operation in the normal mode to the axis adjustment mode, the number of target objects to be detected is fixedly specified as the number of reflectors (with the number being 1, in this case). Hence the radar apparatus 10 performs direction calculation processing on the assumption that the incident wave number is 1. Thus, due to the fact that the radar apparatus 10 does not perform processing for estimating the incident wave number, errors which result from that estimation processing are avoided. As a result, as illustrated in FIG. 7C, the estimated target object direction information that is obtained by the radar apparatus 10 does not vary with time, so that the detected direction of the single target object (reflector) can be displayed to a high degree of accuracy, free from fluctuations.

Hence the operator can utilize the graph displayed by the display section 507 to adjust the orientation of the radar apparatus 10 (hence, of the antenna 19) until the angular error $\Delta\Theta$ (as displayed by the display section 507) becomes zero, so that the orientation direction of the receiving antenna 19 is accurately aligned along the central axis C. In that condition, the operator then fixedly attaches the radar apparatus 10 to the vehicle.

Optimum accuracy can thereby be achieved for the orientation direction that is finally set for the receiving antenna 19.

The radar apparatus 10 can thereafter accurately calculate the directions of target objects by using a coordinate system of the vehicle (based on the central axis C) to define a reference direction. The vehicle separation control ECU 100 can thus perform control processing to a high degree of accuracy based on target object direction information that is supplied from the radar apparatus 10.

Although the above embodiment has been described for the case of a radar apparatus utilizing the MUSIC method of direction detection, the invention would be equally applicable to a radar apparatus which calculates the respective directions of target objects by utilizing a method other than the MUSIC method. In addition, it would be possible to utilize methods of estimating an incident wave number other than the method used with the above embodiment.

It will also be understood that the invention is not limited to the apparatus configuration described above and that various modifications or alternative configurations could be envisaged, which fall within the scope claimed for the invention in the appended claims.

What is claimed is:

1. A method of adjusting an orientation direction of an array antenna of a direction detection apparatus to be aligned along a specific direction, said array antenna comprising a plurality of antenna elements and said direction detection apparatus comprising a transmitting antenna and transmitting circuitry adapted to transmit radar waves, and receiving circuitry adapted to acquire respective received signals of said antenna elements, with said received signals resulting from reflected radar waves that are incident on said antenna elements, direction calculation circuitry adapted to calculate respective directions of said incident radar waves based on said received signals of said antenna elements, with said calculation being executed based on an assumption that a total number of said incident wave directions is a specific set value, output circuitry adapted to output information expressing said directions that are calculated by said direction calculation circuitry, and estimation setting circuitry adapted to derive an estimated number of said incident wave directions, based on said received signals of said antenna elements, and to establish said estimated number as said set value that is utilized by said direction calculation circuitry;

wherein said method comprises adjusting said orientation direction of the array antenna to become aligned in a predetermined relationship to one or more stationary objects from which reflected radar waves are received by said array antenna and which are disposed at predetermined directions with respect to said antenna array, by:

inhibiting said operation of said estimation setting circuitry for establishing said estimated number as said set value that is utilized by said direction calculation circuitry, establishing a predetermined fixed number as said set value that is utilized by said direction calculation circuitry, and adjusting said orientation direction based upon an estimated direction of at least one of said stationary reflecting objects as expressed by said information outputted by said output circuitry.

2. The method according to claim 1, wherein said, predetermined fixed number is equal to a total number of said stationary reflecting objects.

3. The method according to claim 1, comprising a single stationary reflecting object, wherein said adjustment is performed to align said orientation direction of said array antenna along a direction of said single stationary reflecting object with respect to said array antenna.

4. A direction detection apparatus comprising a transmitting circuit in combination with a transmitting antenna, for transmitting radar waves, an array antenna comprising a plurality of antenna elements and a receiving circuit coupled to receive respective received signals of said antenna elements, with said received signals resulting from reflected radar waves that are incident on said array antenna from one or more respectively different directions, direction calculation circuitry adapted to calculate said directions of said incident radar waves, based on said received signals of said antenna elements, with said calculation being executed based on an assumption that a total number of said incident radar wave directions is a specific set value, output circuitry adapted to produce information expressing said directions that are calculated by said direction calculation circuitry, estimated value setting circuitry adapted to derive an estimated number of said incident radar wave directions, based on said received signals of said antenna elements;

fixed value setting circuitry adapted to predetermine a total number of said respectively different directions to be applied as said set value that is utilized by said direction calculation circuitry, and operation control circuitry responsive to an externally supplied command signal for selectively establishing, as said set value that is utilized by said direction calculation circuitry, said estimated number of incident wave directions and said predetermined fixed number.

5. The apparatus according to claim 4, comprising an electronic apparatus capable of communication with said direction detection apparatus, said electronic apparatus comprising an information display device, an input device operable by a user for inputting external commands to said electronic apparatus, display control circuitry adapted to acquire said direction information from said output circuitry of said direction detection apparatus, and to control said information display device for displaying said direction information, and mode changeover circuitry responsive to an external command specifying a fixed incident wave number mode for transmitting a corresponding command signal to said operation control circuitry of said direction detection apparatus, designating that said predetermined total number of said respectively different directions be established as said set value, and responsive to an external command specifying an estimated incident wave number mode for transmitting a corresponding command signal to said operation control circuitry, designating that said estimated number be established as said set value.

6. The method according to claim 1, wherein the orientation direction is horizontal.

7. The apparatus according to claim 4, further comprising means for inhibiting operation of said estimated value setting circuitry.

* * * * *